Inventor
Kenneth Hartley

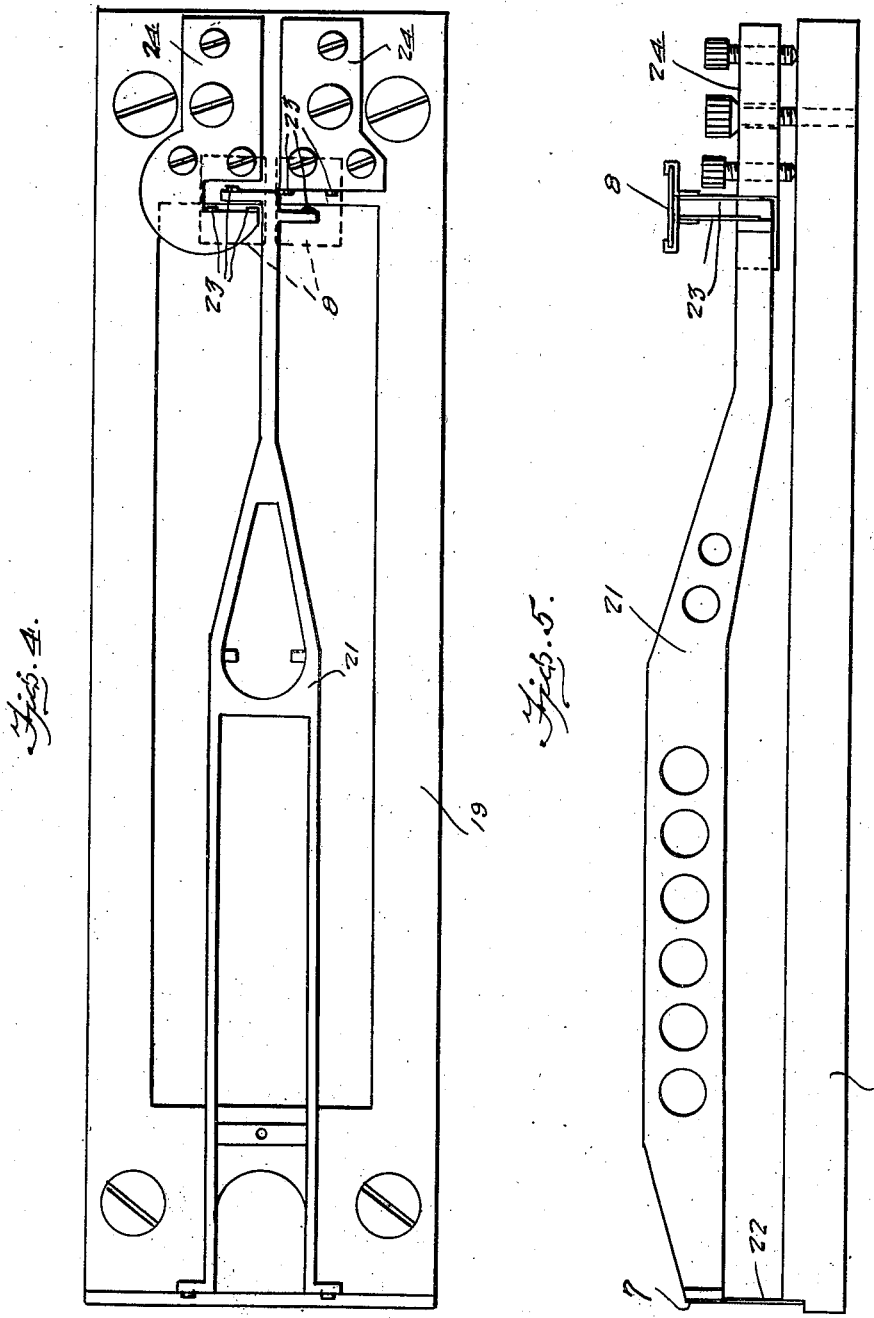

Patented Feb. 21, 1933

1,898,534

UNITED STATES PATENT OFFICE

KENNETH HARTLEY, OF HOUSTON, TEXAS

MEASURING INSTRUMENT

REISSUED

Application filed October 3, 1931. Serial No. 566,773.

This invention appertains to new and useful improvements in measuring instruments and more particularly to an instrument for measuring small differences in the force of gravity.

The principal object of this invention is to provide a measuring instrument for measuring small differences in the force of gravity with a precision of about one-ten thousandth of a dyne per gram, which is about one-ten millionth of the total force.

Previous attempts to do this have not succeeded in getting better than one part in one hundred thousand; chiefly because of difficulties due to temperature effects and to elastic hysteresis.

During the course of the following specification, other important objects and advantages of the invention will readily become apparent to the reader.

In the drawings:—

Fig. 4 represents a top plan view of the base and beam.

Fig. 5 represents a side elevational view of the base and beam.

Figure 1:
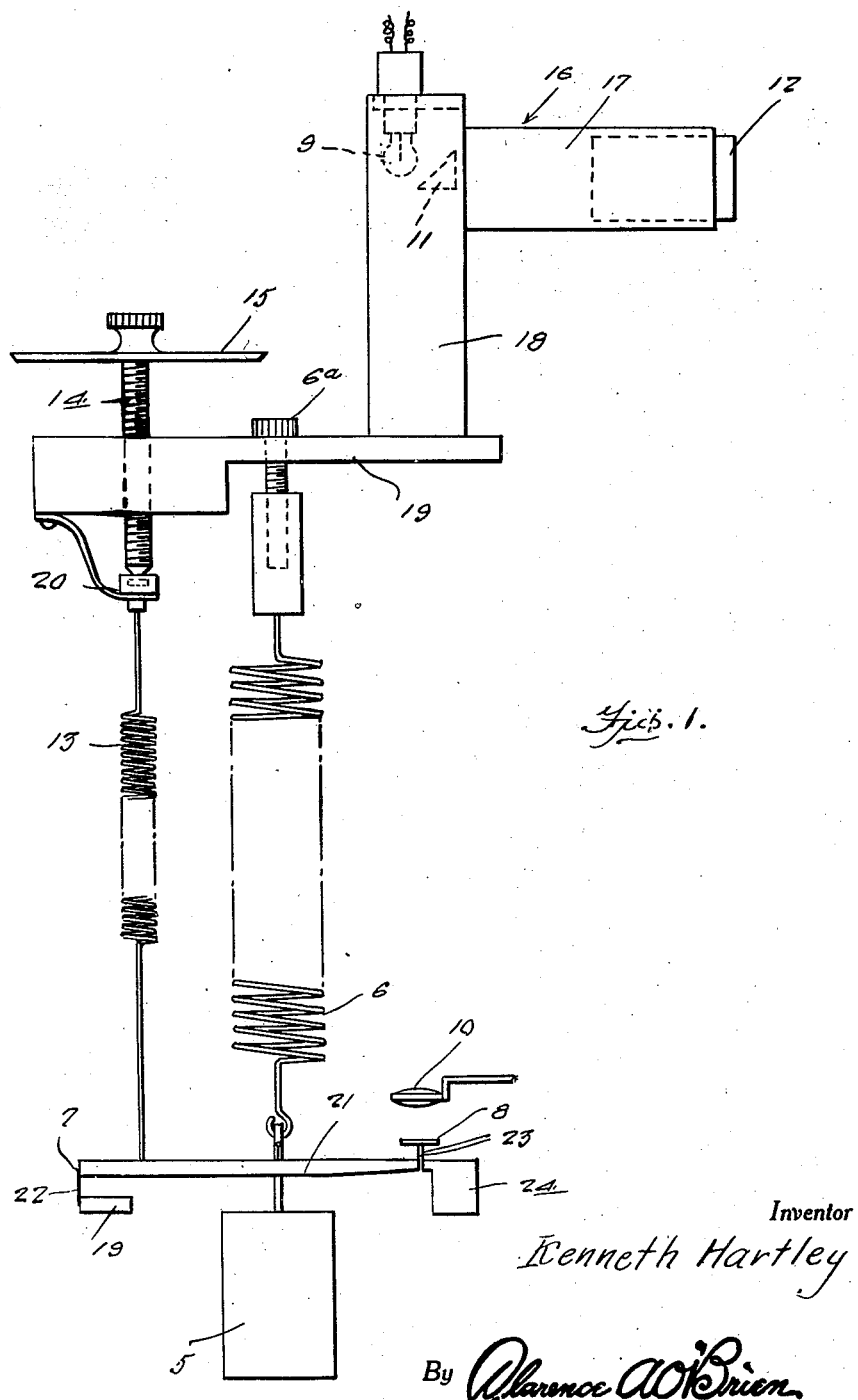
Figure 1 represents a side elevational view of the instrument diagrammatically arranged.
Figure 2:
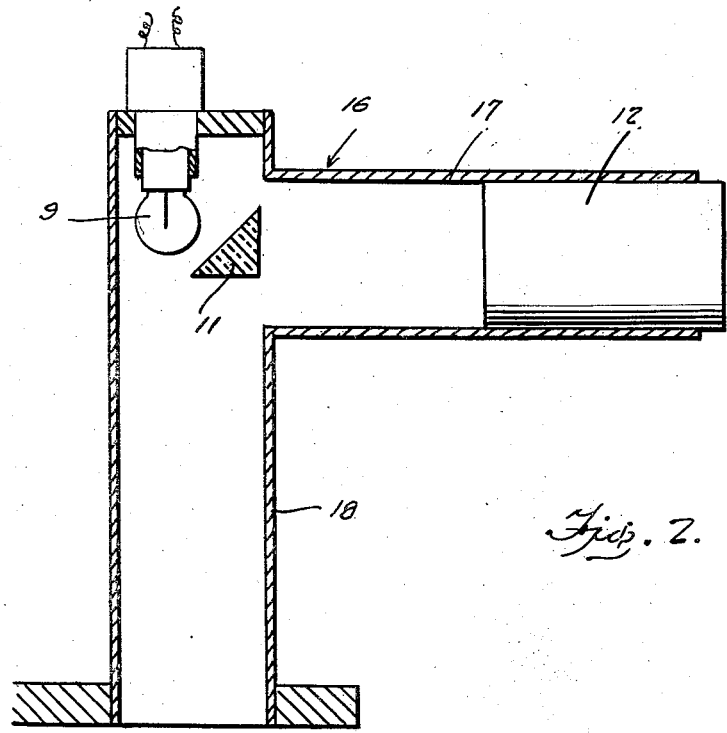
Fig. 2 represents a vertical sectional view through the scope.
Figure 3:
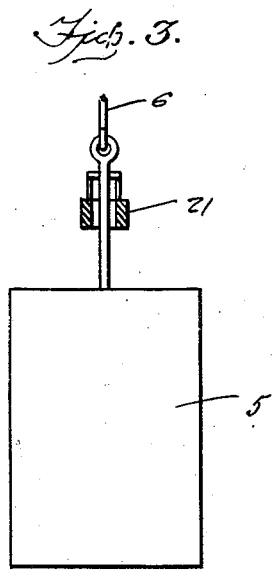
Fig. 3 represents a vertical sectional view through the beam looking toward the weight.
Figure 6:
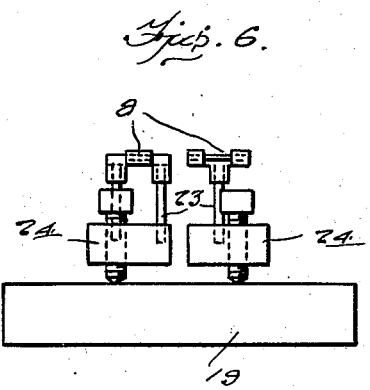
Fig. 6 represents an end elevational view of the base looking toward the mirrors and beam adjusting means having ports omitted.

Referring to the drawings wherein like numerals designate like parts, it can be seen that a weight 5 suspended from a spring 6 and flexibly connected to a very light weighing beam hinged at one end, as at 7 by a pair of phosphor bronze ribbons while its opposite end carries a pair of small mirrors 8. Light from a small electric lamp 9 at the top of the apparatus passes through a lens 10 and is reflected from the mirrors back through the lens to the reflecting prism 11 and then to the eye piece 12 where an image of the filament of the lamp can be observed.

If the two mirrors 8 are in the same plane, the two images form a single line of light, as seen through the eye-piece, but if they are not in the same plane, the images will not coincide. The mirrors are so mounted that movement of the beam causes them to rotate in opposite directions; thus moving the reflected images of the lamp in opposite directions each mirror acting as an "optical lever" while the points of the support one millimeter apart and the distance from the mirror to the eyepiece about 600 millimeters so that the magnification is 1200 for each mirror and the apparent relative movement of the two images of the lamp filament is 2400 times the actual movement of the beam.

The tension in the main spring 6 is adjusted by the screw 6a so that it does not quite lift the weight to the zero position but leaves a small fraction of the load (about 1/1000) to be carried by a light auxiliary spring 13, which may be referred to as the "weighing spring".

The tension in this spring 13 is controlled by the micrometer screw 14 at the top so that small changes in the gravitational pull can be compensated for by altering the tension in the weighing spring so as to bring the mirrors back into the same plane. This spring 13 is calibrated so that the reading of the micrometer dial 15 gives the actual change in gravitational force in thousandths of a dyne per gram.

A suitable locking mechanism not shown in the drawings, holds the weight accurately in the zero position between observations so that the spring is kept under constant tension and never relaxes, thus avoiding errors due to hysteresis. This mechanism is complex, as each side of the spring must be securely held so that jolting will not produce an increased stress in any part. However, such securing means can be taken care of in numerous ways, and need not form part of the present invention.

The effect of temperature on the spring is compensated for, as far as possible, by an arrangement of expansion members in the frame, similar to the old "grid iron" compensated pendulum, and then the whole instrument is enclosed in a thermostat which will maintain the temperature constant to within 1/100 of a degree during a whole series of observations. The ordinary laboratory thermostat would not be convenient for field use but a special type can be devised to accompany the device in the field.

The observation scope generally referred to by numeral 16 and which includes the aforementioned lamp 9, prism 11, and eye piece 12, has the eye piece 12 mounted within the horizontal tube 17 which communicates with the vertical tube 18 at the upper end thereof, at which point the prism 11 and lamp 9 are located.

It can also be observed, that the lamp is provided with a straight filament, so that the image of the filament to the observer will be a straight line of light.

The tube 18 adjusting screw 6a and micrometer screw 14, are carried by the frame 19 and as is apparent in Fig. 1, it is necessary that some form of bearing block 20 be provided between the micrometer 14, and the weighing spring 13.

The aforementioned weighing beam, which is denoted by numeral 21 is connected to the frame 19 or some other suitable support by the ribbon 22 of phosphor bronze or other suitable material. As can be clearly seen in Figs. 4 and 5, the beam is constructed of aluminum or some other suitable light material, so that its weight will be as light as possible.

Numeral 23 represents phosphor bronze ribbons for connecting the mirrors 8 to the beam 21 and stationary supports 24.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A measuring instrument of the character described comprising a pivoted beam, said pivoted beam including a weight, a supporting spring for the weight, a weighing spring for the beam, a light source, and a pair of mirrors on the beam with which the light source is focused, a reflecting medium, and an observation scope associated with the reflecting medium.

2. A measuring instrument of the character described comprising a pivoted beam, a weight attached to the beam and provided with a spring support, a weighing spring, micrometer screw associated with the weighing spring for controlling the balance, a light source, mirrors on the beam for reflecting the light from the light source, and an observation scope concentrated on the said mirrors.

3. A measuring instrument of the character described comprising a swingable beam, a weight attached to the beam and provided with a spring support, a weighing spring, micrometer screw associated with the weighing spring for controlling the beam, a light source, mirrors on the beam for reflectng the light from the light source, an observation scope concentrated on the said mirrors, said light source having a single straight filament and a lens for producing images of the filament reflected by the said mirrors.

4. A measuring instrument of the character described comprising a pivoted beam, a weight attached to the beam and provided with a spring support, a weighing spring, micrometer means associated with the weighing spring for controlling the beam, a light source, mirrors on the beam for reflecting the light from the light source, an observation scope concentrated on the said mirrors, a stationary support, each of said mirrors being provided with a strap extending from itself to the beam, and another strap extending from itself to the stationary support.

In testimony whereof I affix my signature.

KENNETH HARTLEY.